J. CALLICOTT.
CHECK VALVE.
APPLICATION FILED NOV. 26, 1917.

1,279,511.

Patented Sept. 24, 1918.

Inventor
John Callicott.

By his Attorney
Stanley Lightfoot.

UNITED STATES PATENT OFFICE.

JOHN CALLICOTT, OF TORONTO, ONTARIO, CANADA.

CHECK-VALVE.

1,279,511.  Specification of Letters Patent.  Patented Sept. 24, 1918.

Application filed November 26, 1917. Serial No. 204,050.

*To all whom it may concern:*

Be it known that I, JOHN CALLICOTT, of the city of Toronto, in the county of York, in the Province of Ontario, in the Dominion of Canada, have invented certain new and useful Improvements in Check-Valves, and do hereby declare that the following is a full, clear, and exact description of same.

This invention relates to valves of the type generally known as check valves, having for its object to provide a device adaptable to all the general purposes of a check valve and also capable of operating under respectively varying closing and releasing pressures, that is to say, the valve may be closed by the action of a predetermined fluid pressure and may remain so closed notwithstanding a reduction in such pressure, the opening of the valve taking place when the pressure has dropped to a desired extent.

A further object is to provide interchangeable parts of the valve whereby the operation of the said valve may be varied to suit requirements by the addition to, removal, or substitution of such interchangeable parts where necessary or desirable.

Further objects subsidiary to or resulting from the aforesaid main objects or from the construction of the invention as it may be carried into effect will become apparent as the nature of the invention is hereinafter further disclosed.

In carrying the said invention into effect I may provide a novel construction and arrangement of parts whereby a ball check valve is inclosed by a ball casing having an outlet orifice at one end thereof and an inlet orifice at the opposite end thereof, which said inlet orifice accommodates a seat for the said ball in the form of a tube inserted into the said ball casing and suitably ground to receive the ball, the cavity in the casing being of such configuration that the ball may close the outlet orifice in one position and snugly seat itself in the correspondingly-shaped wall of the said cavity, and when in its open or inactive position will permit free passage of air around the said ball and through said outlet orifice from the said tubular valve seat, which is provided with radial recesses or passages to permit such fluid circulation. The tubular valve seat is intended to accommodate the spindle of a plunger slidably contained withi na valve casing connected to the said ball casing, said plunger normally resting upon a suitable seat in the said casing and surmounting a slidable weight or float, as may be necessary or desirable, which weight or float has a fluid passage therein normally closed more or less by the said plunger, and this float is also slidable within the valve casing, which is provided with an inlet orifice beneath the said weight or float by which fluid is admitted to the valve, all of which is more particularly described and ascertained hereinafter, having reference to the accompanying drawings, in which:—

Figure 1:
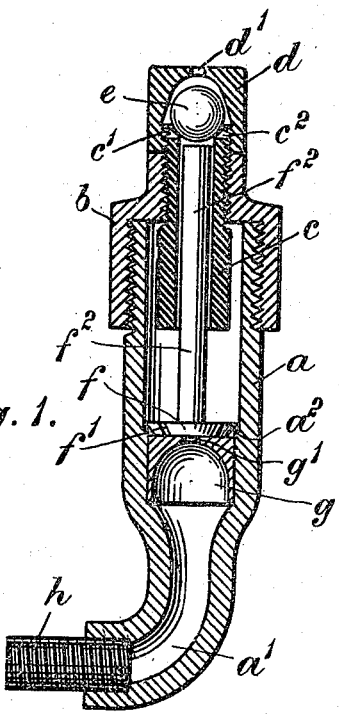
Figure 1 is a sectional elevation of a valve constructed in accordance with this my invention.
Figure 2:
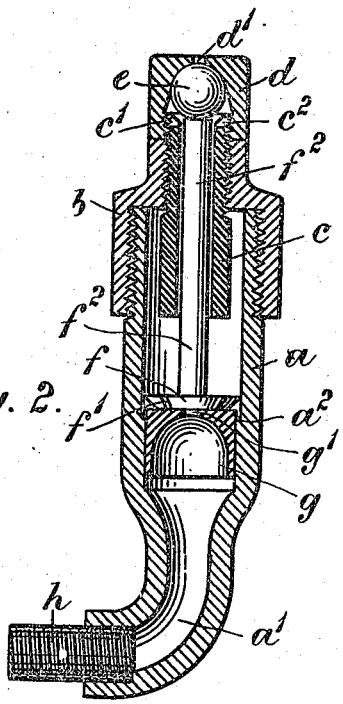
Fig. 2 is a similar view of Fig. 1 illustrating the parts in different position.
Figure 3:
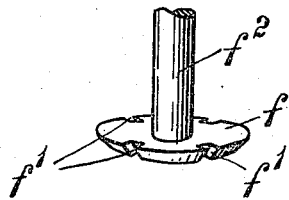
Fig. 3 is a broken perspective view of the spindle.
Figure 4:
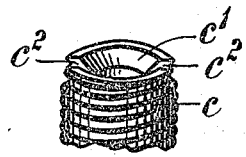
Fig. 4 is a broken perspective view of the upper end of the tubular ball valve seat.

Similar characters of reference indicate similar parts in the several figures of the drawings, and Figs. 3 and 4 are drawn to a somewhat larger scale than Figs. 1 and 2.

$a$ is the valve casing having at one end an inlet orifice $a'$ and at the other end a cap $b$ carrying a tubular ball valve seat $c$, the said cap $b$ being surmounted by a ball casing $d$ which has an outlet orifice $d'$ in the upper end thereof and engages with the said tubular valve seat $c$, $e$ being the ball which is accommodated in the said ball casing $d$ and normally rests upon the upper end of the tubular valve seat $c$, which is preferably beveled as at $c'$ to properly receive the said ball. As is clearly indicated in the drawing, the cavity in the ball casing is so shaped that when the ball is at rest or in its inactive position a free air space therearound is provided whereby the outlet $d'$ may be said to be open, and when the ball is raised it will seat itself against the wall of the seat throughout a substantial part of its spherical surface whereby slight pressure will be required to retain it in such closed position. Communication between the axial orifice of the tubular valve seat and the cavity in the ball casing, when ball is at rest, is established by radial recesses or passages $c^2$ in the walls of the said tubular valve seat. $f$ is the plunger slidably accommodated in the valve casing $a$, being preferably of frusto-conical form and normally seating upon an annular ridge or seat $a^2$ in the said casing and being provided with recesses $f'$ in its periphery, the said plunger having a spindle $f^2$ extending axially therefrom into the tubular valve seat $c$ in proximity with the ball $e$ when the said parts are at rest or in their inactive position. $g$ is a slidable member also accommodated within the casing $a$ beneath the said plunger $f$ and may be in the form of a weight or float, as may be necessary or desirable, the said member $g$ having a fluid passage $g'$ therein normally more or less closed by the said plunger. The said member $g$ in the example seats itself on the base of the said casing $a$ which is restricted at this point for this purpose. $h$ is a nipple extending from the annular orifice $a'$ of the valve whereby it may be secured to such device with which it is desired to be used.

The relative arrangement and construction of the parts described is intended to permit the passage of fluid, at a pressure lower than a certain predetermined degree, through the orifice $g'$ by the slight raising of the plunger $f$ and around the sealed ball $e$, whereby it may so escape through the outlet $d'$. The clearance between the upper end of the spindle $f^2$ permits any slight raising of the plunger which may be necessary to permit the passage of such fluid thereunder without disturbing the ball and the orifice $g'$ limits the effective pressure upon the said plunger, to prevent undue raising thereof until the pressure may increase to an extent causing the member $g$ to be raised, when the spindle of the plunger will effect the closing of the ball valve $e$, closing the valve. Where the member $g$ is in the form of a float, a surge or undue quantity of a heavy fluid, and a water, would have the same closing effect. A decrease of pressure, whilst permitting the parts $f$ and $g$ to descend, may still retain the ball valve in its closed position, as will be readily understood, so that the valve would remain closed until the pressure was reduced to a predetermined extent below that required to close the valve, owing to the nature of its seat, as described, whereby pressure is relieved from approximately the entire upper surface of the ball, except that exposed to the outlet $d'$, which is subject to ordinary atmospheric pressure. It will be seen that the passage around the ball is somewhat restricted, above the center of said ball, so that pressure of escaping fluid is greatest at this point and tends to retain the valve open until the plunger operates as hereinbefore described.

It will be seen that the working parts of the device may easily be of a readily interchangeable nature, so that parts, such as $g$, may be used in varying weights to suit the conditions under which the valve is intended to be used; and in cases where the closing pressure is not to be so particularly determined, the member $g$ may be omitted.

This invention may be developed within the scope of the following claims without departing from the essential features of the said invention and it is desired that the specification and drawings be read as being merely illustrative and not in a limiting sense, except as necessitated by the prior art.

What I claim as my invention is:

1. A device of the class described, comprising a ball casing having an outlet orifice therein, a ball within said casing, a plunger casing communicating with said ball casing and having an inlet orifice therein, a plunger slidably accommodated within said plunger casing, said plunger being adapted, when raised, to move said ball to close said outlet orifice, and said ball being capable of retention in such closing position at a lower pressure than that required to raise said plunger, and a slidable member, operable beneath said plunger, having a restricted passage therein through which fluid is admitted to said plunger.

2. In a device of the class described, a ball casing, a plunger casing communicating therewith, said ball and plunger casings having outlet and inlet orifices therein respectively, a ball within said ball casing, a tubular seat between said casings for said ball, said seat having passages therein whereby fluid may pass through the device when said ball is at rest, and a plunger having a stem slidable in said tubular seat to move said ball to close said outlet orifice, said ball being capable of retention, in such closing position, at a lower pressure than that required to raise said plunger.

3. In a device of the class described, a ball casing, a plunger casing communicating therewith, said ball and plunger casings having outlet and inlet orifices therein respectively, a ball within said ball casing, a tubular seat between said casings for said ball, said seat having passages therein whereby fluid may pass through said device when said ball is at rest, a plunger having a stem slidable in said tubular seat to move said ball to close said outlet orifice, said ball being capable of retention, in such closing position, at a lower pressure than that required to raise said plunger, and a slidable member, operable beneath said plunger, having a restricted passage therein through which fluid is admitted to said plunger.

Signed at the city of Toronto, in the county of York, in the Province of Ontario, in the Dominion of Canada, this 24th day of November, 1917.

JOHN CALLICOTT.